(12) United States Patent
Lin et al.

(10) Patent No.: US 7,644,867 B2
(45) Date of Patent: Jan. 12, 2010

(54) BUSINESS CARD SIZED STORAGE DEVICE

(75) Inventors: Wen-Lung Lin, Chung Ho (TW);
Yi-Ling Liu, Chung Ho (TW);
Chang-Cheng Tsai, Chung Ho (TW)

(73) Assignee: Power Quotient International Co., Ltd., Taipei (TW)

( * ) Notice: Subject to any disclaimer, the term of this patent is extended or adjusted under 35 U.S.C. 154(b) by 164 days.

(21) Appl. No.: 11/808,402

(22) Filed: Jun. 8, 2007

(65) Prior Publication Data
US 2008/0104299 A1 May 1, 2008

(30) Foreign Application Priority Data
Jun. 12, 2006 (TW) .............................. 95120783 A

(51) Int. Cl.
*G06K 19/06* (2006.01)
(52) U.S. Cl. .................. 235/486; 235/492; 361/737; 710/62; 710/74; 710/301; 710/313
(58) Field of Classification Search ................. 235/451, 235/486, 487, 439, 441, 492; 439/151, 501; 361/737; 710/62, 74, 313, 301
See application file for complete search history.

(56) References Cited

U.S. PATENT DOCUMENTS

| | | | | |
|---|---|---|---|---|
| 5,208,732 A * | 5/1993 | Baudouin et al. | ........... | 361/704 |
| 5,476,387 A * | 12/1995 | Ramey et al. | ............... | 439/76.1 |
| 5,529,503 A * | 6/1996 | Kerklaan | .................... | 439/76.1 |
| 5,667,390 A * | 9/1997 | Keng | .......................... | 439/76.1 |
| 5,941,733 A * | 8/1999 | Lai | ............................. | 439/610 |
| 6,567,273 B1 * | 5/2003 | Liu et al. | .................... | 361/737 |
| 6,648,224 B2 * | 11/2003 | Lee | ............................. | 235/451 |
| 6,654,841 B2 * | 11/2003 | Lin | ............................. | 710/301 |
| 6,676,420 B1 * | 1/2004 | Liu et al. | .................... | 439/131 |
| 6,705,891 B1 * | 3/2004 | Lin | ............................. | 439/528 |
| 7,009,847 B1 * | 3/2006 | Wu et al. | .................... | 361/737 |
| 7,025,275 B2 * | 4/2006 | Huang et al. | ................ | 235/486 |
| 7,136,288 B2 * | 11/2006 | Hoogerdijk | ................. | 361/737 |
| 7,151,673 B2 * | 12/2006 | Le et al. | ..................... | 361/737 |
| 7,301,776 B1 * | 11/2007 | Wang et al. | ................. | 361/737 |
| 7,407,393 B2 * | 8/2008 | Ni et al. | ..................... | 439/131 |
| 2004/0026516 A1* | 2/2004 | Liu et al. | .................... | 235/492 |
| 2004/0215966 A1* | 10/2004 | Elteto | ......................... | 713/182 |
| 2006/0164816 A1* | 7/2006 | Deng | ......................... | 361/737 |
| 2008/0227380 A1* | 9/2008 | Hsu et al. | .................... | 454/184 |

* cited by examiner

*Primary Examiner*—Michael G Lee
*Assistant Examiner*—Suezu Ellis
(74) *Attorney, Agent, or Firm*—Ming Chow; Sinorica, LLC

(57) ABSTRACT

A business-card sized storage device which is a thin metal housing built-in with a flash memory module.

7 Claims, 5 Drawing Sheets

BUSINESS CARD SIZED STORAGE DEVICE

FIELD OF THE INVENTION

The present invention relates to a storage device, and more particularly to a business card sized storage device which is a thin metal housing built-in with a flash memory module.

BACKGROUND OF THE INVENTION

The most popular flash memory storage device currently available in the market is a USB flash drive, also named as a pen drive or thumb drive, as shown in FIG. 1. The structure of the storage device includes a housing A, in which a circuit board is disposed with a flash memory module. To enable the transmission of data between the storage device and a computer, one side of the housing A is protrudingly disposed with a connector B, which in general is a USB (universal serial bus) interface connector. Also, the connector B is adapted onto a slip cover C. Because the connector B has a considerable thickness, the storage device cannot be made thin. Thus, further improvement concerning the thickness of the storage device is required.

In fact, the design difficulties will be encountered in making a flash memory storage device thinner can be summarized as follows:

(1) The insufficient strength of the housing: In making the housing thinner, the strength of the thin metal cannot withstand the stress developed and thus the housing cannot protect the flash memory module disposed inside, leading to a possible damage to the flash memory module.

(2) The difficulty in joining the housing: The housing consists of an upper and a lower covers usually made of metal to increase its strength. Metal cannot be joined by heat fusion through high-frequency wave in a way similar to join plastics parts, and thus difficulties will be encountered in the assembling and joining. If the metal housing is replaced with an upper and lower plastics covers, the conventional high-frequency wave may be able to be joined the upper and lower cover; however, the problem of insufficient strength described in (1) may occur.

(3) The difficult in mounting the connector: Since a thin storage device is thinner than the available USB interface connector, it would be awkward to see a currently available USB interface connector protruding from its housing. Consequently, it is necessary to provide a thin connector to be mounted inside the housing from which the USB interface connector can protrude outwards to connect with a computer. These problems demand the industry to find ways to overcome.

SUMMARY OF THE INVENTION

In view of the foregoing shortcomings of the prior art, the inventor of the present invention based on years of experience in the related industry to conduct extensive researches and experiments, and finally invented a business card sized storage device in accordance with the present invention.

The primary objective of the present invention is to provide a business card sized storage device that comprises: a housing having an upper and lower covers, from whose edges extend downward to form a sidewall, respectively, and in turn establish an internal space; a circuit board with circuit layout with one of its surface disposed with a control module and a plurality of flash memories; a frame formed by joining a plurality of side trims which encompass the circuit board therein and whose tops and bottoms are applied with glue to join the upper and lower covers such that the two covers may be joined face-to-face; and a connector whose one end is disposed with a plug and the other end is connected with a wire which is passed through the housing and connected with the circuit board to establish an electrical connection.

Another objective of the present invention is to provide a business card sized storage device, wherein the frame is disposed with a receiving portion for the accommodating and positioning of the thin plug of the connector, the housing corresponding to the plug is formed to have a notched portion to expose the plug, and the thin plug is connected with the circuit board through a wire to be received into or pulled out of the housing.

A further objective of the present invention is to provide a business card sized storage device, wherein the circuit board extends to form a connecting portion having a plurality of contact terminals and the end of the connector wire is disposed with a connecting portion having a plurality of contact terminals, both of connecting portions which are received in a concave portion formed by the frame to establish an electrical connection, wherein the concave portion protrudes inward to form at least a protruding tenon passing through the connecting portion of the connector and then the connecting portion of the circuit board so as to secure their positions.

Another further objective of the present invention is to provide a business card sized storage device, wherein the frame is disposed therein with a reinforced rib and a plurality of partitioning ribs along the longitudinal and transverse directions, respectively, so as to separate the neighboring flash memories.

A further objective of the present invention is to provide a business card sized storage device, wherein the wire of the thin plug is a flexible circuit board comprising a hard surface mount stuck at least on a segment of its surface, wherein the hard surface mount is a thin metal.

A further objective of the present invention is to provide a business card sized storage device, wherein the plug is in a thin form and conforms to the USB interface definition, and the surface of the plug is disposed with a metal decoration piece whose one corner is formed to have a partitioning groove to form a foolproof structure.

DETAILED DESCRIPTION OF THE PREFERRED EMBODIMENTS

The structure, technical measures and effects of the present invention will now be described in more detail hereinafter with reference to the accompanying drawings that show various embodiments of the invention.

Figure 1:
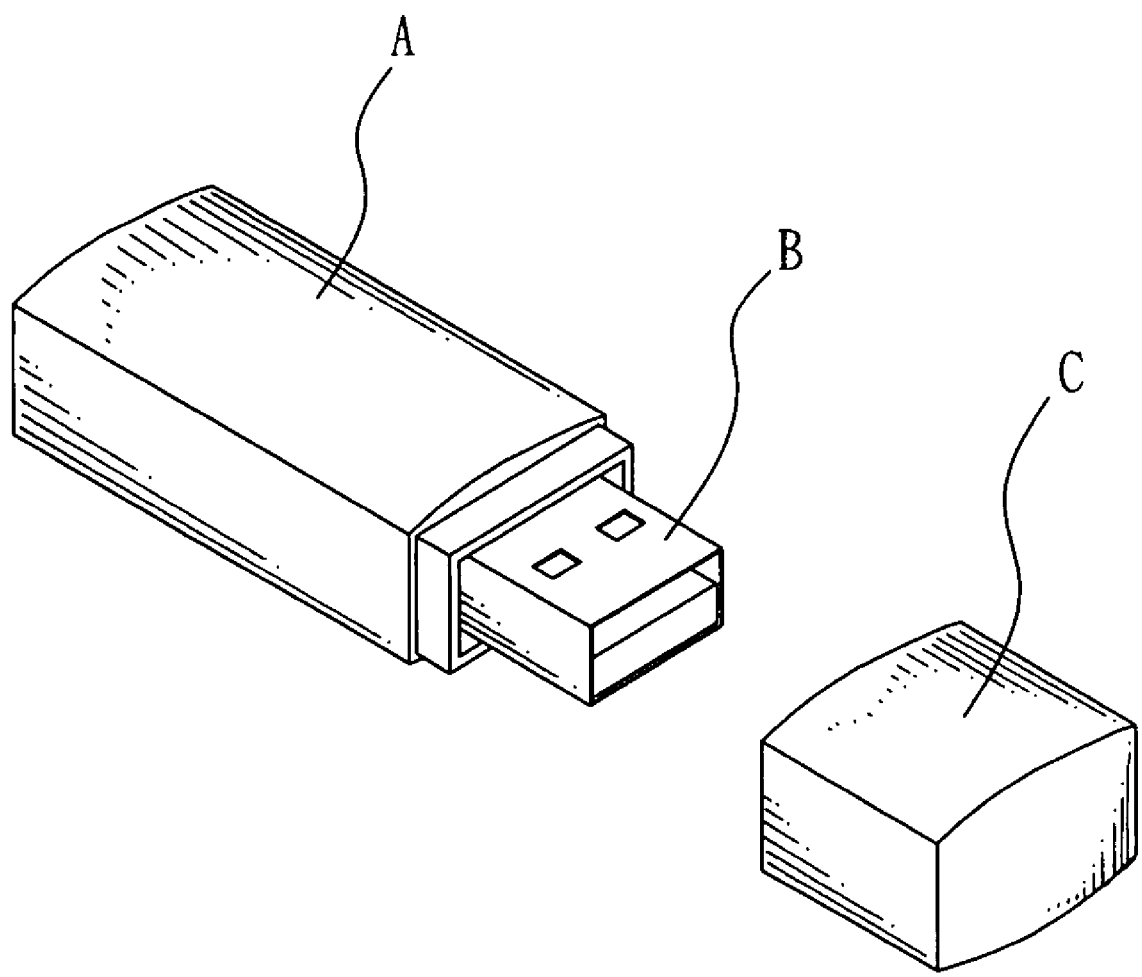
FIG. 1 is a perspective view of a conventional USB flash drive.
Figure 2:
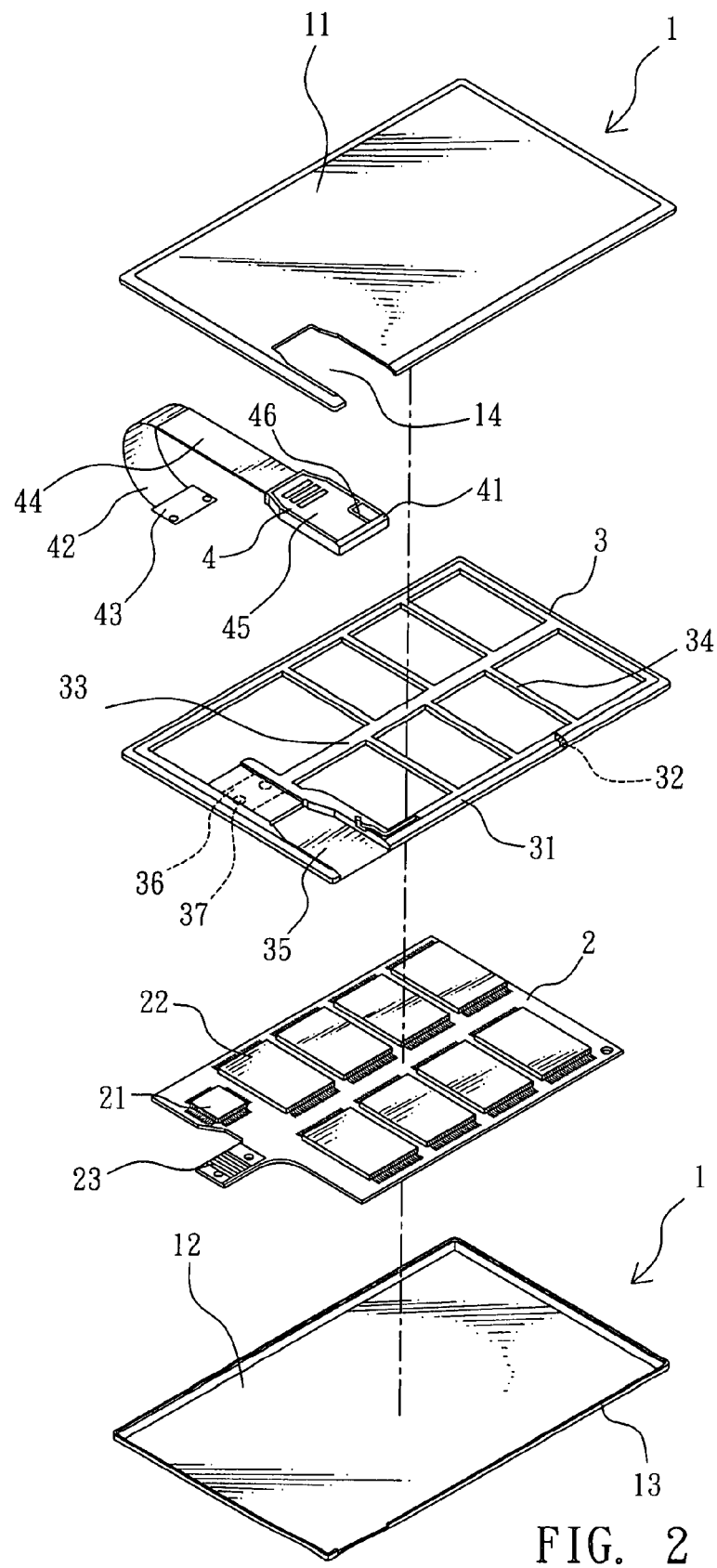
FIG. 2 is an exploded view of a business card sized storage device of the present invention.
Figure 3:
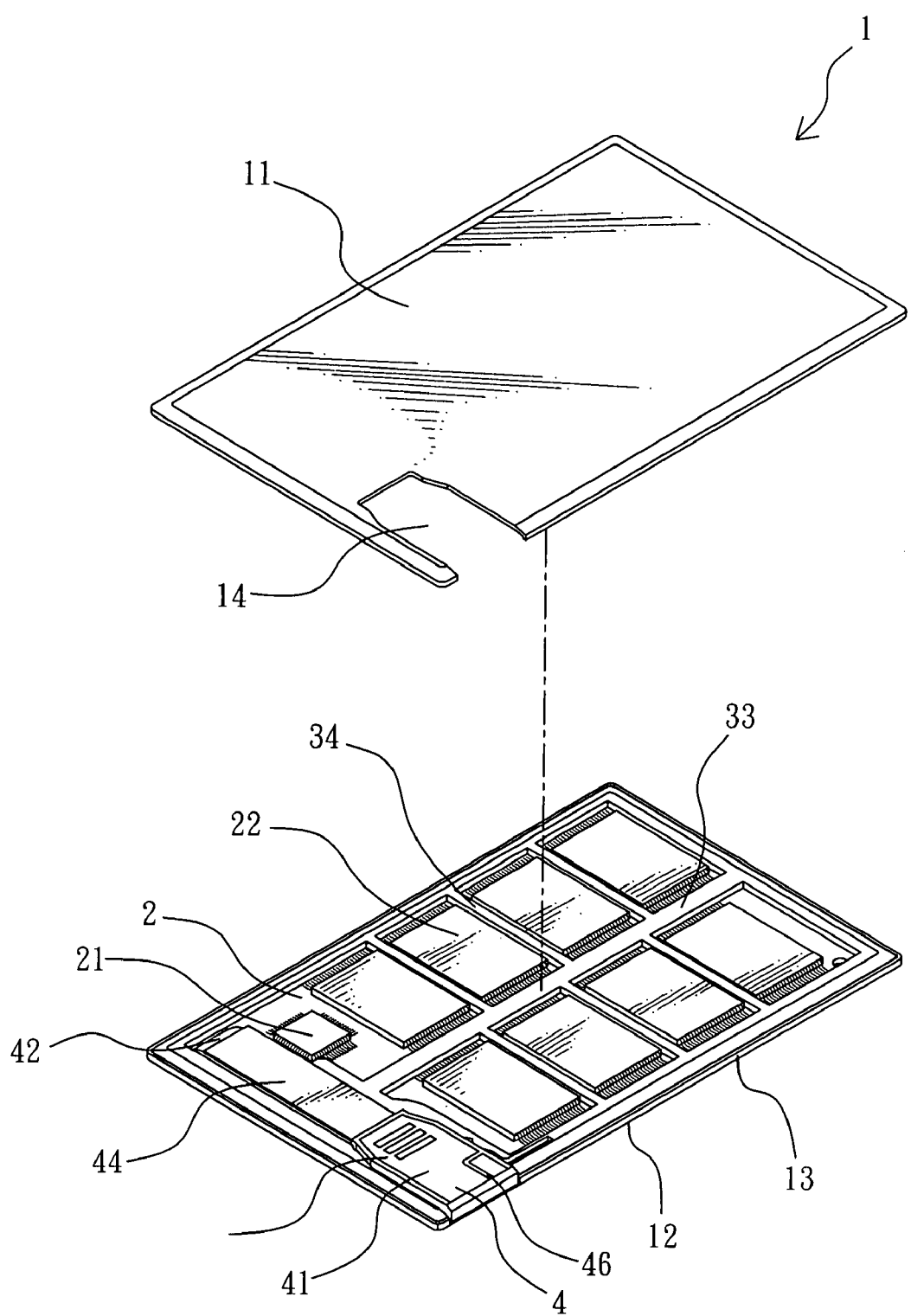
FIG. 3 is a perspective view of a business card sized storage device of the present invention with the upper cover being lift up.

Referring to FIGS. 2 and 3, the business card sized storage device comprises a housing 1, a circuit board 2, a frame 3, and a connector 4.

The housing 1 made of metal comprising an upper and lower covers 11, 12. To establish an internal space to accommodate the circuit board 2, the frame 3, and the connector 4 described later, the edges of the covers 11, 12 are bent downward to form a side wall 13, wherein one cover, the upper cover 11 for example, is formed to have a notched portion 14 so as to expose the connector 4.

The circuit board 2 is a flat board provided with circuit layout and disposed with a memory module having a control module 21 and a plurality of flash memories 22 to store data, which is a conventional art and will not be discussed further. The circuit board 2 of the present invention differs from the conventional art in that it extends to form a connecting portion 23 disposed with a plurality of contact terminals so as to establish an electrical connection with the connector 4 described later.

Furthermore, the plurality of flash memories 22 are arranged on one surface of the circuit board 2 with space between each of them so as to avoid the thickness increased as a result of arranging flash memories on both sides of the circuit board 2 and thus achieve the realization of a thin device.

The frame 3 is formed by joining a plurality of side trims 31 each of whose inner bottom edges is provided with a recess 32, respectively, to form a receiving space so as to accommodate the circuit board 2. Thus the circuit board 2 is encompassed with the bottom of the frame 3 such that the control module 21 and a plurality of flash memories 22 protrudingly disposed on the top are also accommodated in the space formed by the frame 3.

Furthermore, the frame 3 is disposed therein with at least a reinforced rib 33 and a plurality of partitioning ribs 34 along the longitudinal and transverse directions, respectively, so as to separate the neighboring flash memories 22. The side trim 31, reinforced rib 33, and partitioning ribs 34 are to increase the overall strength of the structure and to enhance the rigidity of the frame 3. The top and bottom faces of the frame 3 are applied with glue to join the upper and lower covers 11, 12 to facilitate the connection of the two metal covers.

Also, one side of the frame 3, namely the side corresponding to the location of the notched portion 14, protrudes inward to form a receiving portion 35 and its neighboring bottom is formed to have a concave portion 36, which protrudes downward to form at least a protruding tenon 37 to pass through the connector 4 and then the connecting portion 23 of the circuit board 2 so as to secure their positions and facilitate an electrical connection between them.

The connector 4 comprises a thin plug 41 accommodated in the receiving portion 35 and protruding out of the notched portion 14 and a long-strip flexible circuit board 42 extending from the rear of the thin plug 41. The end of the circuit board 42 is disposed with a connecting portion 43 comprising a plurality of contact terminals, which allows at least one protruding tenon 37 to pass through therefrom and form a lap joint with the connecting portion 23 of the circuit board 2 described earlier to establish an electrical connection.

The thin plug 41 comprise some contact terminals (not shown due to the projection angle) which can be inserted and connected with the USB port of a computer to establish an electrical connection. In addition, to prevent the repetitive pulling or inserting of the flexible circuit board 42 from wearing or fracturing, the thin plug 41 is stuck with at least a hard surface mount 44, a thin metal for example, on at least a certain portion of its one side to increase its wear resistance and structural strength. Moreover, to achieve a consistent aesthetic appearance of the protruding thin plug 41 and the housing 1, the surface of the thin plug 41 is disposed with a metal decoration piece 45. On the other hand, a partitioning groove 46 is formed at one corner of the metal decoration piece 45 to form a foolproof structure to prevent a short circuit from occurring as a result of erroneous inserting.

Figure 4:
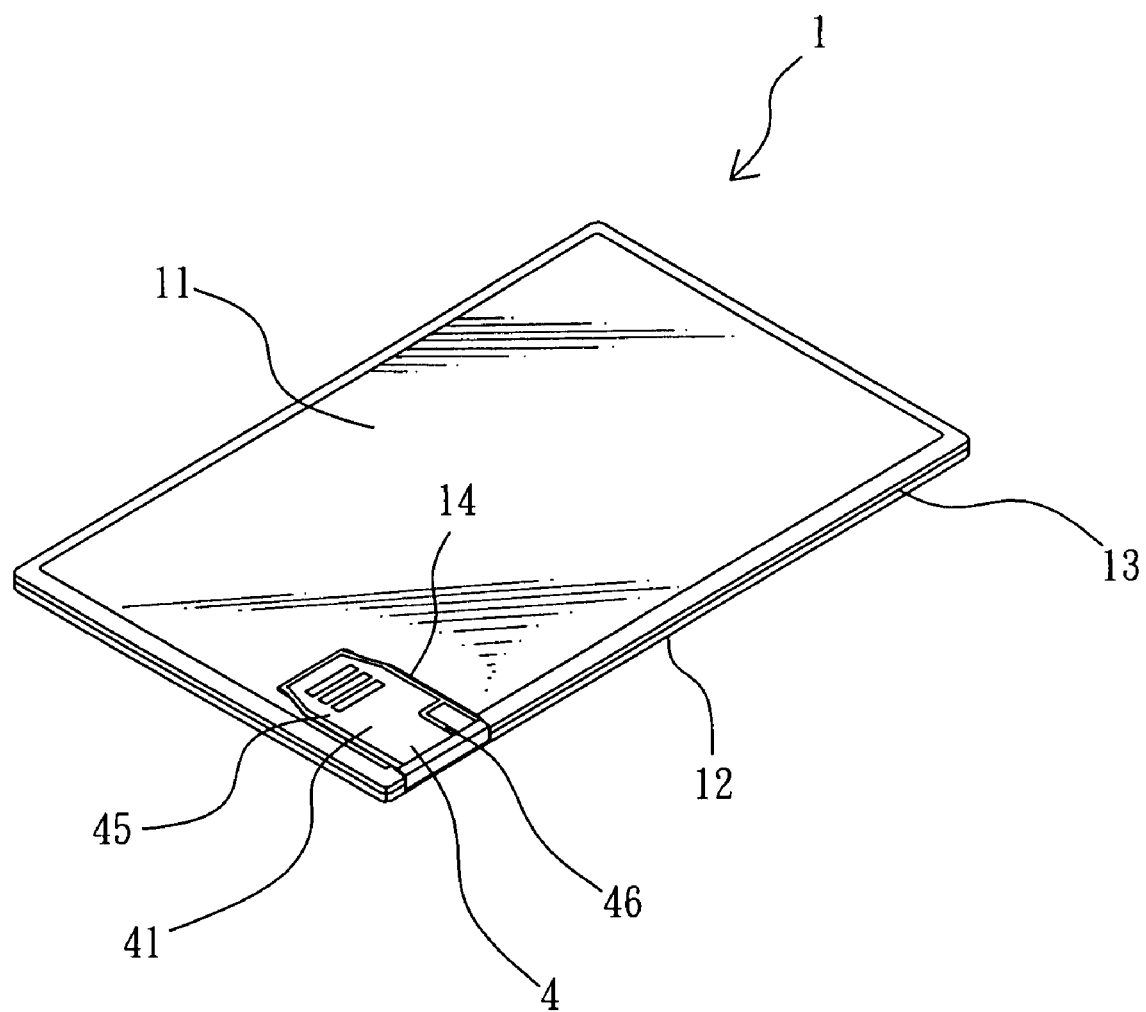
FIG. 4 is a perspective assembly view of a business card sized storage device of the present invention.
Figure 5:
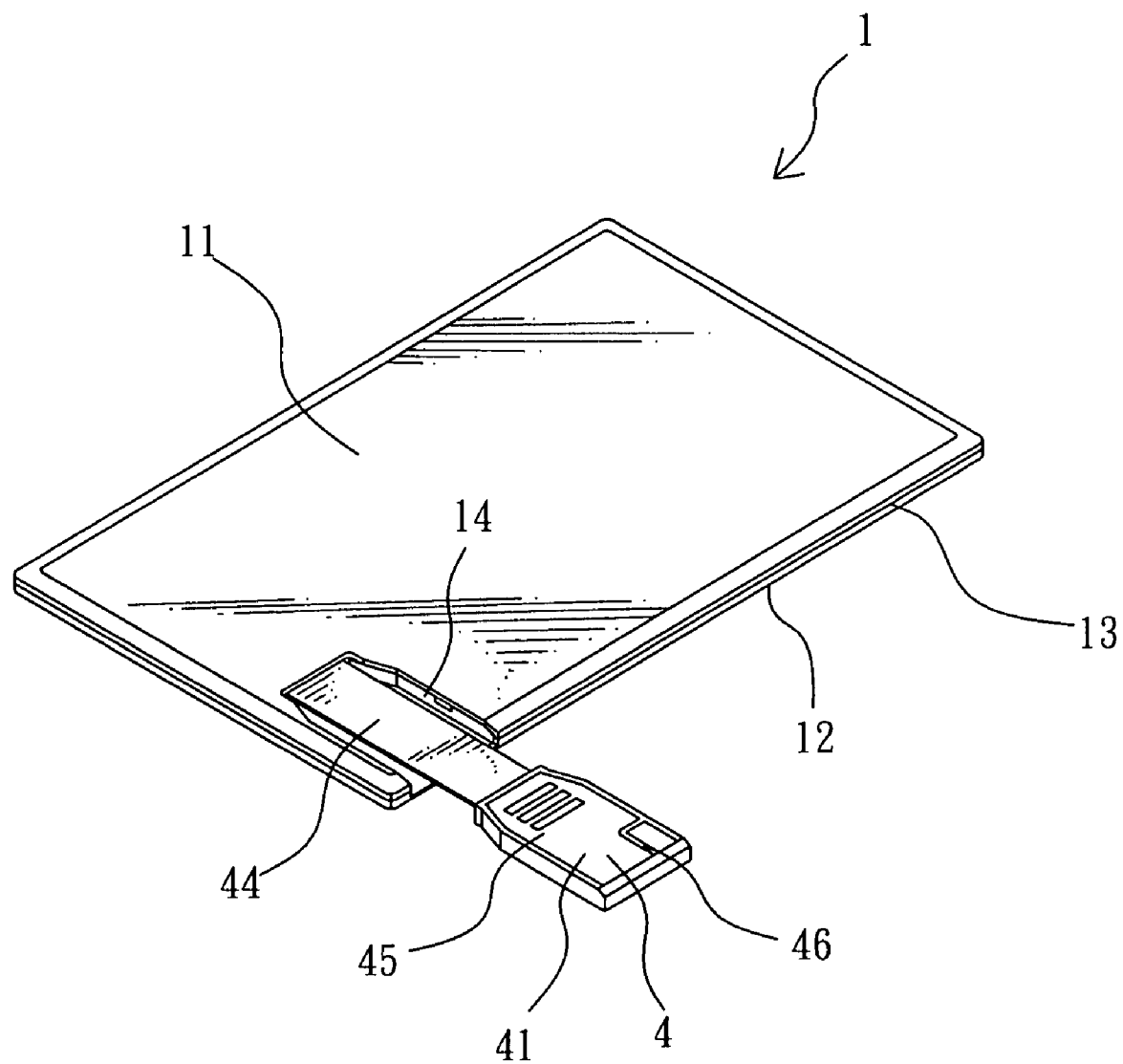
FIG. 5 is a perspective view of a business card sized storage device of the present invention with the connector being pulled out.

When the present invention is assembled according to the preceding descriptions, a business card sized storage device as shown in FIG. 4 will be obtained. When the present invention is being used, it is merely necessary to pull the plug 41 and insert and connect into a connection port, a USB interface port of a computer for example, to establish an electrical connection and to read, write, or delete data.

With the implementation of the present invention, the conventional flash memory storage device, a USB flash memory for example, is not limited to the shape of a pen and can take the shape of a business card characterized with "light, thin, short, small." Further, the frame can be connected with the circuit board to increase the overall structural strength and used as a medium to join the two covers. Also, the reinforced rib and partitioning ribs longitudinally and transversally disposed in the side trim of the frame can further enhance the frame's rigidity and also separate the neighboring flash memories. Further, the connecting portion on one end of the connector is secured in the notched portion of the frame and forms an electrical contact with the connecting portion of the circuit board. The other end of the connector extends to form a thin plug, which may be received in or pulled out of the housing so as to be used conveniently. The present invention is definitely a novel breakthrough of the flash memory storage device.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A business card sized storage device, comprising:
    a housing having an upper and lower covers whose edges extend downward to form a sidewall, respectively, and establish an internal space;
    a circuit board with circuit layout with one surface disposed with a control module and a plurality of flash memories;
    a frame formed by joining a plurality of side trims which encompass the circuit board therein and the tops and bottoms of the frame are applied with glue to join the upper and lower covers and the two covers are joined face-to-face;
    a connector with one end being disposed with a plug and another end being connected with a wire which is passed through the housing and connected with the circuit board to establish an electrical connection;
    the frame is disposed with a receiving portion for accommodating and positioning of the plug of the connector, wherein the plug is thin;
    the housing corresponding to the plug is formed to have a notched portion to expose the plug, and the plug is connected with the circuit board through the wire being received into or pulled out of the housing;
    the wire of the plug is a flexible circuit board comprising a hard surface mount stuck at least on a segment of a surface of the wire;
    the plug is in a thin form and conforms to the Universal Serial Bus interface definition; and the surface of the plug is disposed with a metal decoration piece whose one corner is formed to have a partitioning groove to form a foolproof structure.

2. The business card sized storage device of claim 1, wherein the circuit board extends to form a connecting portion having a plurality of contact terminals and the end of the wire is disposed with a connecting portion having a plurality of contact terminals, both of connecting portions which are received in a concave portion formed by the frame to establish an electrical connection.

3. The business card sized storage device of claim 1, wherein a concave portion protrudes inward to form at least a protruding tenon passing through a connecting portion of the connector and the connecting portion of the circuit board to secure their positions.

4. The business card sized storage device of claim 1, wherein the plurality of flash memories are arranged on one surface of the circuit board with space between each of them.

5. The business card sized storage device of claim 1, wherein each of the inner bottom edges of the side trims is provided with a recess, respectively, to form a receiving space to accommodate and position the circuit board.

6. The business card sized storage device of claim 1, wherein the frame is disposed therein with a reinforced rib and a plurality of partitioning ribs along the longitudinal and transverse directions, respectively, to separate the neighboring flash memories.

7. The business card sized storage device of claim 1, wherein the hard surface mount is a thin metal.

* * * * *